(12) United States Patent
Boucher (10) Patent No.: US 7,222,882 B2
(45) Date of Patent: May 29, 2007

(54) LOADER IMPLEMENT (75) Inventor: Jean-Francois Boucher, Orleans (FR)

(73) Assignee: Deere & Company, Moline, IL (US)

( * ) Notice: Subject to any disclaimer, the term of this patent is extended or adjusted under 35 U.S.C. 154(b) by 466 days.

(21) Appl. No.: 10/940,835

(22) Filed: Sep. 14, 2004

(65) Prior Publication Data
US 2005/0073140 A1    Apr. 7, 2005

(30) Foreign Application Priority Data
Oct. 4, 2003    (DE)    ................................ 103 46 115

(51) Int. Cl.
B60R 21/13    (2006.01)
(52) U.S. Cl. ..................... 280/756; 180/89.13; 37/347
(58) Field of Classification Search ............. 180/89.13, 180/89.14; 280/756; 414/686; 37/347, 37/304, 411, 196
See application file for complete search history.

(56) References Cited

U.S. PATENT DOCUMENTS

| 3,584,897 | A |   | 6/1971  | Frantz et al. |         |
|-----------|---|---|---------|---------------|---------|
| 3,599,813 | A | * | 8/1971  | Totz          | 414/697 |
| 3,632,134 | A | * | 1/1972  | Babbitt et al. | 280/756 |
| 3,754,315 | A | * | 8/1973  | Heitmen       | 29/401.1|
| 3,964,782 | A | * | 6/1976  | Pernicka et al. | 296/102 |
| 4,060,261 | A | * | 11/1977 | Bauer et al.  | 280/756 |
| 4,159,835 | A | * | 7/1979  | Leja et al.   | 280/756 |
| 4,202,565 | A |   | 5/1980  | Mosch         |         |
| 5,240,366 | A | * | 8/1993  | Bamford       | 414/686 |
| 5,470,190 | A | * | 11/1995 | Bamford et al. | 414/686 |
| 5,503,430 | A | * | 4/1996  | Miki et al.   | 280/756 |
| 5,941,330 | A | * | 8/1999  | Miller et al. | 180/89.15|
| 5,971,434 | A | * | 10/1999 | Neufeld et al. | 280/756 |
| 6,283,220 | B1| * | 9/2001  | Carter        | 169/24  |
| 6,729,431 | B2| * | 5/2004  | Osuga et al.  | 180/312 |
| 6,990,757 | B2| * | 1/2006  | Takemura et al. | 37/347 |
| 6,997,667 | B2| * | 2/2006  | Hackett et al. | 414/685 |

FOREIGN PATENT DOCUMENTS

EP    1 488 962    6/2004

OTHER PUBLICATIONS

Product Brochure "VALIANT 400-500" By The Company BCS Publication No. 901000766-Jul. 2002.

* cited by examiner

Primary Examiner—Paul N. Dickson
Assistant Examiner—Toan C. To (57) ABSTRACT

A loader implement includes a support mast that is provided with a mounting area for a front loader arrangement. The loader implement includes a roll-over protective assembly that is coupled to one of the other or both of the loader implement, or support mast. The protective assembly can be selectively pivoted between a raised protective position wherein it extends over an operator's platform and a lowered non-protective position, wherein it extends forward of the operator's platform. So as to prevent the loader arrangement from being used without the benefit of the protective assembly in its protective position, the mounting area for the loader arrangement is blocked by the protective assembly when the latter is in its non-protective position and is not cleared to permit the mounting of the loader arrangement until the protective assembly is moved to its protective position.

9 Claims, 6 Drawing Sheets

LOADER IMPLEMENT

FIELD OF THE INVENTION

A loader implement includes a support mast provided with a mounting area for a loader arrangement, in particular for a front loader, and for at least part of a roll-over protective frame assembly, that can be brought into a protective position and a non-protective position. Furthermore, the invention concerns a support mast of a loader arrangement.

BACKGROUND OF THE INVENTION

In the state of the art, agricultural vehicles such as tractors are known with which loader operations can be performed by means of a loader arrangement, for example, a front loader. Loader operations can include stacking operations, but also planning operations, shove operations or clearing operations. In part such vehicles are offered for sale without an operator's cab, in particular in the case of smaller vehicles, for example, small tractors, with which in addition to loader operations other operations can also be performed in narrow spaces and particularly in spaces with low overhead. In order to protect the operator of the implement, such vehicles are equipped with a roll-over protective structure in the form of a roll-bar extending in the vertical direction behind or in front of the implement operator's seat.

For operations in narrow or low space, the roll-bar may be an obstacle. For this reason, many manufacturers of such vehicles offer a roll-bar that can be pivoted or even folded, so that if necessary or desired, the vehicle can be operated with a roll-bar that has been pivoted downward or folded together.

Such vehicles are offered for sale, for example, by the company BCS. A small tractor with a mounted loader arrangement is disclosed in a product brochure "VALIANT 400–500" by the company BCS publication number 901000766-07/2002, in which the roll-bar is pivoted from a vertical position over the front hood of the vehicle and can be locked in a horizontal position. The problem here is that during the installation of the loader arrangement, the pivoted roll-bar can remain in a horizontal position, so that an operator of the vehicle could fail to erect the roll-bar. However, without the roll-bar the safety of the operator is impaired.

The problem underlying the invention is seen in the fact that the safety of the implement operator may be impaired during loader operations.

SUMMARY OF THE INVENTION

According to the present invention, there is provided a novel arrangement for mounting a roll-over protective assembly to a loader implement which may be equipped with a front loader.

An object of the invention is to equip a loader implement with a loader support mast which is so arranged relative to a roll-over protective assembly such that at least a portion of the latter must be placed in an operative protective position before a loader can be mounted to the loader support mast. Alternatively, this object can be accomplished by providing a second mechanism which is pivoted in response to pivoting the protective assembly to its non-protective position, with the second mechanism then blocking the mounting area for the loader arrangement.

If the loader implement is operated without a loader arrangement, there should appropriately be a guarantee that the protective assembly can be pivoted into the non-protective position. For this purpose, a retaining arrangement or an anchoring arrangement can be provided for the protective assembly between an operator's platform of the loader implement and the support mast. Preferably, the support mast for the loader arrangement is attached at the side of the loader implement. Moreover, an arrangement of the retaining arrangement for the protective assembly between the flank of the loader implement and the support mast is also possible, so that the roll-over protective device is arranged to pivot o the inner side of the support mast. Further more, it is also conceivable to fasten the protective assembly directly to the support mast for the loader arrangement and thereby to configure the retaining arrangement or anchoring arrangement of the roll-over protective assembly and the support mast as a combined component. The protective assembly can be connected in joints, free to pivot, by means of a hinge or a pin to the support mast in such a way that, during the pivoting, the protective assembly does not collide with any part of the support mast. A pivoting of the protective assembly into the non-protective position is appropriate at the time when the least possible height of the loader implement is required in order to avoid any damage, for example, to branches projecting into the path of movement of the protective assembly during operation in fruit orchards.

Preferably a locking arrangement is provided with which the protective assembly can be locked in the protective position or the non-protective position. The locking can be accomplished by means of a spring pin or spring bolt that extends through components of the protective assembly and a corresponding bore of the retaining arrangement or the anchoring arrangement in a pivot region of the protective assembly. It is also conceivable to provide the support mast with corresponding bores for the locking in the pivoting region of the protective assembly, so that the protective assembly can be locked in the protective position or the non-protective position. The locking avoids unintended pivoting movements or vibrations, and the protective assembly can be firmly retained in the protective position whether the loader arrangement is mounted or not mounted.

The locking arrangement preferably includes at least one attaching point or mounting point for the loader arrangement, when the protective assembly is moved into its non-protective position or is retained in the non-protective position. Thereby, on the basis of the mounting process alone, the guarantee is provided that the protective assembly is moved into the protective position in order to free the attaching point of the loader arrangement, which attaching point is used for securing the protective assembly in the non-protective position.

The protective assembly that is designed to fend off any falling loads in addition to its function as a roll-bar, is preferably provided with an upper partial region that, in the protective position, extends generally horizontally over the operator's platform. In the protective position, the protective assembly includes a first section that extends approximately vertically on opposite sides of the operator's platform and has an upper end joined with a second section that extends approximately horizontally over the operator's platform. This second section may be configured as a multi-sided shape or it may extend in the form of a bow. The second section creates a protective covering framework above the operator's platform so that the implement operator of the loader implement is protected against any falling loads from the front and from above.

Preferably, the second section of the protective assembly generally follows the contour of the surface of the hood, so that the protective assembly can ideally be laid around the hood without blocking the view of the operator.

In order to provide an even further far-reaching improvement of the safety of the implement operator, a roll-bar is provided that extends generally in the vertical direction at the rear of the operator's platform. Preferably, this roll-bar is configured so that it can be folded in order that a reduced height dimension of the loader implement can be attained, for example, for operation in fruit orchards or for operation through low underpasses and the like. For this purpose, the roll-bar can be provided with a hinge, for example, at half its height, and can thereby also be brought into a non-protective position.

In a further embodiment, the protective assembly and/or the roll-bar can be constructed so as to permit selected infinite adjustment, or step-wise adjustment in its length or height. This can be attained, for example, by a telescopic arrangement of the components of the protective assembly and/or of the roll-bar and can be locked in their effective length as a function of demand. The locking can be performed, for example, by means of pins that are inserted into correspondingly spaced bores. Tensioning devices are also conceivable here in the form of adjusting screws with which the components can be tensioned with respect to each other. A step-wise change in the effective length has the advantage that the protective function of the protective assembly or the roll-bar need not be omitted, if only a minor reduction in the height of the loader implement is required. Then the protective assembly or the roll-bar need not be brought into the non-protective position so that a protective assembly or roll-bar remains installed for the subsequent protection of the implement operator, although to a reduced extent.

Preferably the protective assembly can be combined with the roll-bar in the protective position. This makes it possible for the protective assembly, in conjunction with the roll-bar, to form a protective cage around the implement operator or around the operator's platform. Thereby the stability of the protective assembly or of the roll-bar is simultaneously improved. For this purpose, the horizontal second section of the protective assembly is rigidly connected to the roll-bar by fasteners in a manner permitting the protective assembly to be selectively released from the roll-bar. It is also conceivable that only the roll-bar, or both the protective assembly and the roll-bar, are provided with an upper section that extends horizontally over the operator's platform. In the latter case, the respective upper sections of the protective assembly and the roll-bar can be releasably connected to each other.

BRIEF DESCRIPTION OF THE DRAWINGS

The drawing shows an embodiment of the invention on the basis of which the invention, as well as further advantages and advantageous further developments and embodiments of the invention, shall be explained and described in greater detail in the following.

DESCRIPTION OF THE PREFERRED EMBODIMENT

Figure 1:
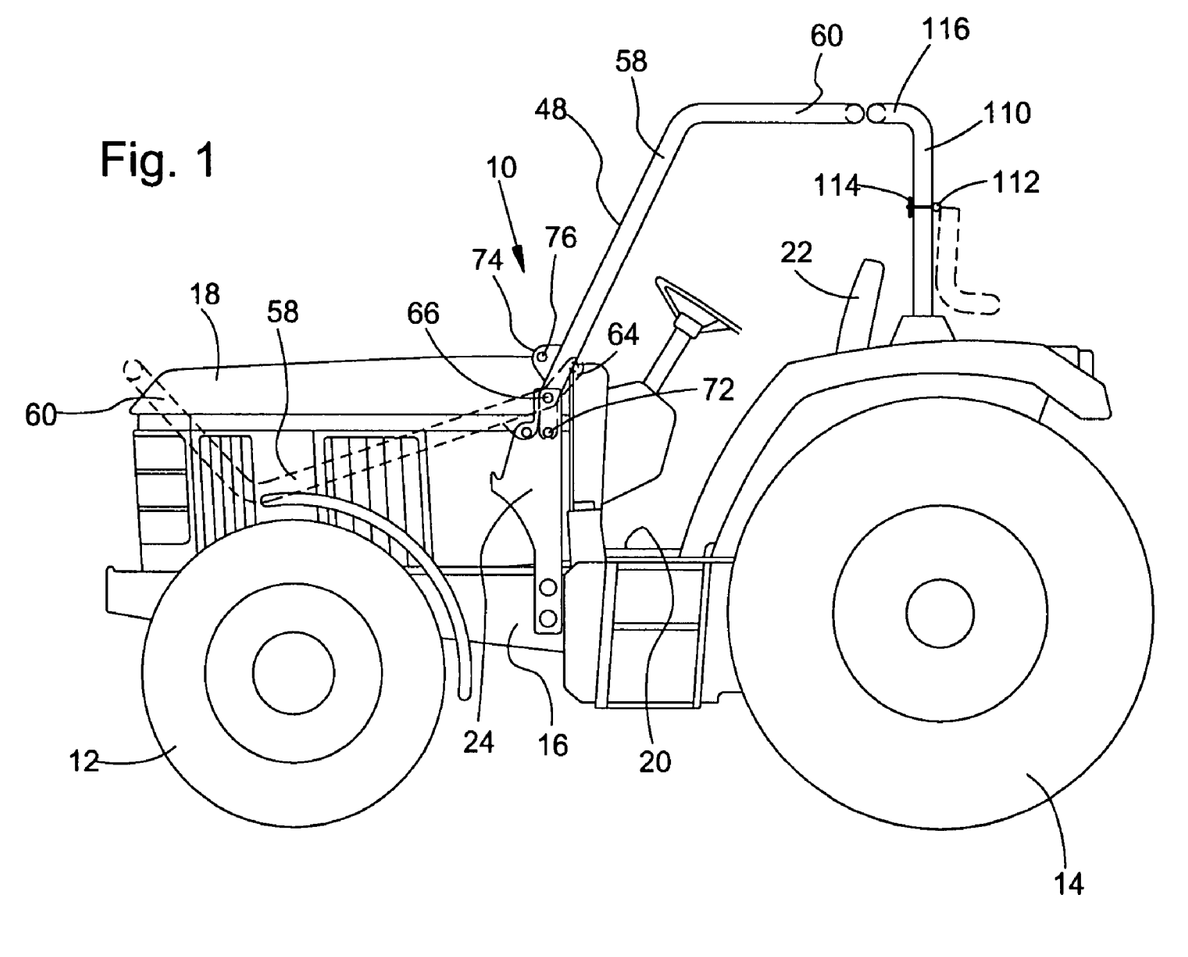
FIG. 1 is a left side view of a loader implement provided with a support mast in accordance with the present invention.
Figure 2:
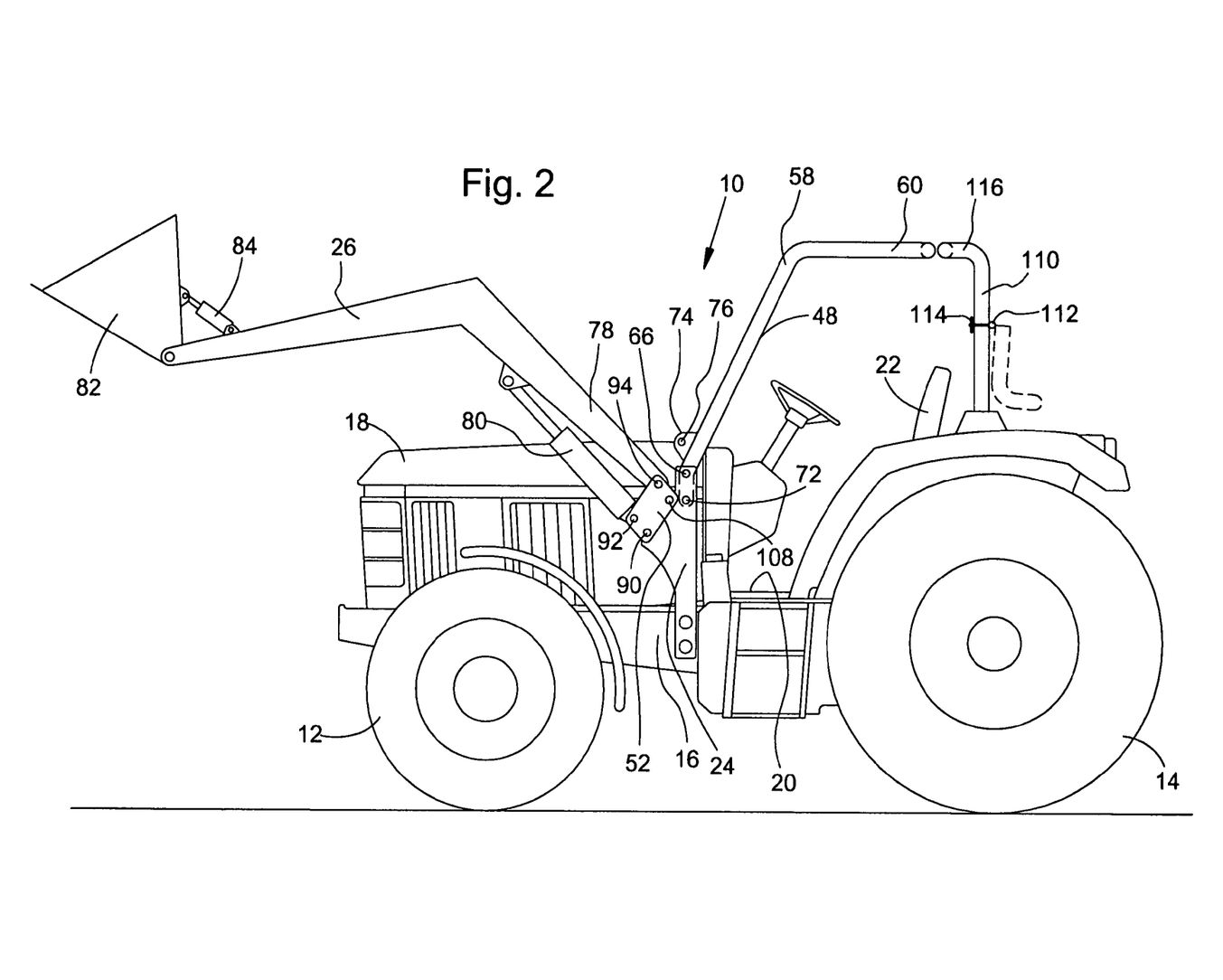
FIG. 2 is a left side view of the loader implement of FIG. 1, showing a loader arrangement mounted to the support mast.
Figure 3:
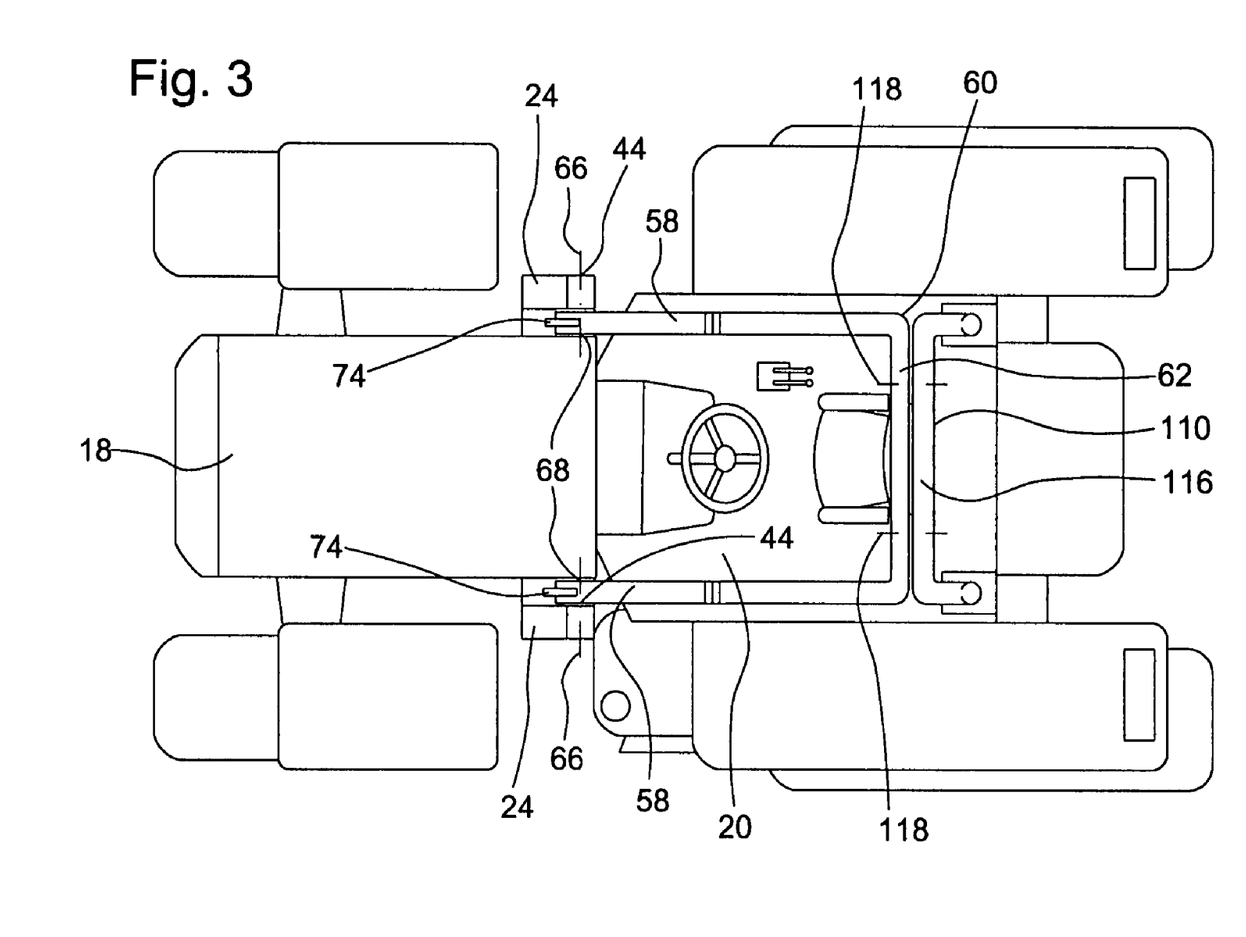
FIG. 3 is a top plan view of the loader implement of FIG. 1.

FIGS. 1–3 show a loader implement 10 constructed in accordance with the principles of the invention. In the embodiment shown, an agricultural tractor is depicted as the loader implement 10. Other loader implements would also be appropriate, such as, for example, small tractors, forestry vehicles, construction vehicles or the like. The loader implement 10 is provided with front and rear wheels 12 and 14, respectively, that are connected to a frame 16 of the loader implement 10. A hood 18 is arranged on a front region of the loader implement 10 above the frame 16. Between the wheels 12 and 14 of the loader implement 10, an operator's platform 20 follows above the frame 16 with an implement operator's seat 22. On either side of the hood 18, the loader implement 10 includes support masts 24 that are used to support a loader arrangement 26, as is shown in FIG. 2.

Figure 4:
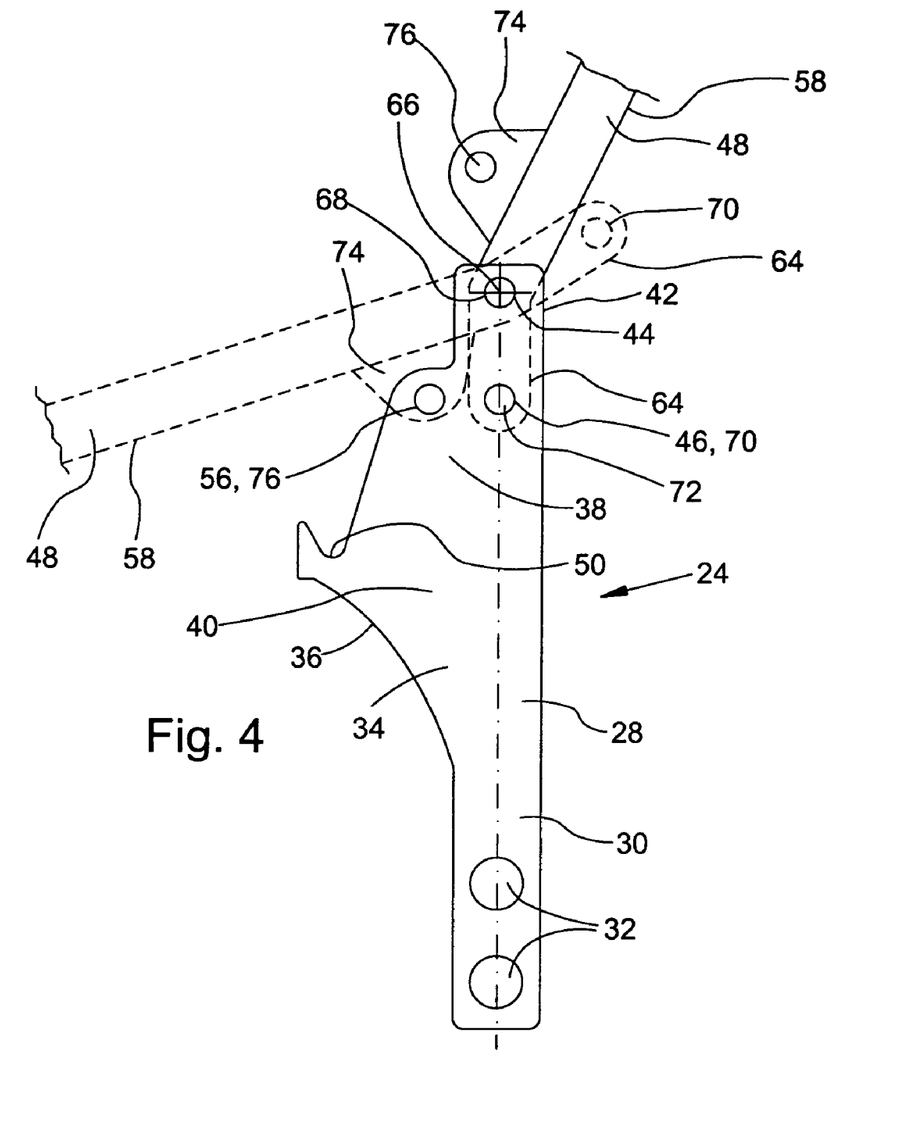
FIG. 4 is an enlarged view of the support mast shown in FIGS. 1 and 2, with a portion of the protective assembly being shown in solid lines in a protective position, and in dashed lines in a non-protective position.
Figure 5:
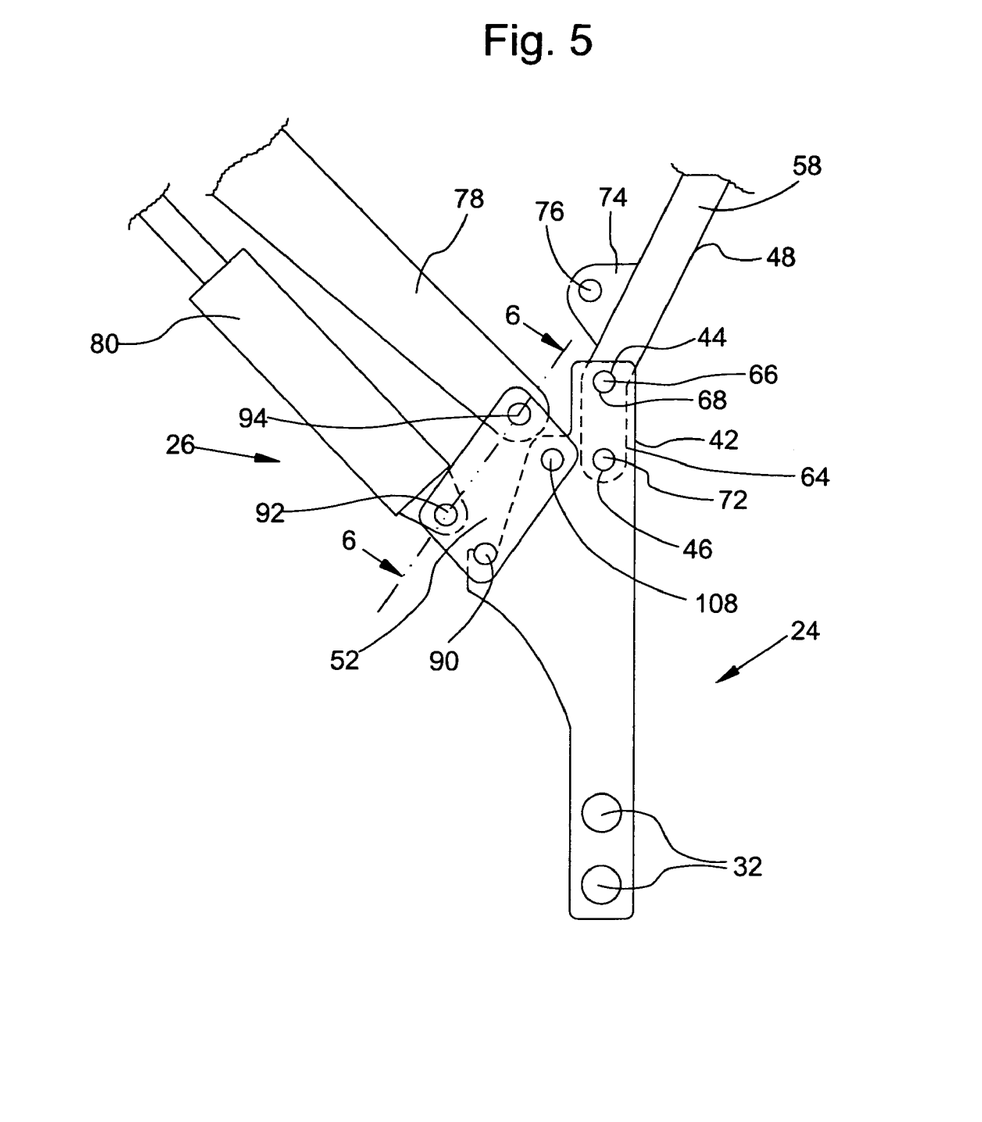
FIG. 5 is an enlarged view of the support mast, as shown in FIG. 4, but with a portion of the loader arrangement being shown attached to the support mast.

The support mast 24 is shown in greater detail in FIGS. 4 and 5. The support mast 24 is comprised generally of a carrier 28 extending in the vertical direction and having a narrow lower end region 30 containing bores 32 arranged in vertical alignment with each other and used in mounting the carrier 28 to the frame 16 of the loader implement 10. The carrier 28 can be fastened, for example, by threaded pins (not shown), that are inserted into the bores 32 and bolted to the frame 16. The carrier 28 is provided with a widening transition section 34 having a forward edge 36 contoured in the form of a bow and that opens in a wide upper end region 38. The upper end region 38 includes a mounting area 40, for the loader arrangement 26, that is arranged above the forward edge 36 and is joined to an upper free end region 42.

At the upper end region 38 of the support mast 24 in the free end region 42, a bore 44 is provided for the bearing support, free to pivot, and another bore 46 for the locking of a roll-over protective arrangement 48, the pivot axes of these bores extend horizontally and transversely to the longitudinal axis of the loader implement 10.

The mounting area 40 is provided, at its forward edge, with a loader-mounting receptacle 50 configured with a hook-shaped contour that opens in the upward direction. The receptacle 50 is used for receiving a sleeve 54 carried by a coupling component 52 (FIG. 6) of the loader arrangement 26. Above the receptacle 50, at an angle of approximately 30° to the receptacle 50 and at the height of the bore 46, a bore 56 is provided between the bore 46 and the receptacle 50 for the fastening of the loader arrangement 26.

The roll-over protective assembly 48 is preferably constructed of material having a circular cross section although other cross sections may be appropriate. The protective assembly 48 can be constructed of tubing as well as solid stock. The protective assembly 48 extends from one side to the other of the loader implement 10, and is provided on both sides of the implement with a profile, which when viewed from the side, as in FIG. 1, includes a long leg 58 and a short leg 60 extending at an angle of approximately 60° to the long leg. A cross member 62 extends transverse to the loader implement 10 and interconnects the short legs 60 of the protective assembly 48 with each other, so that in plan view (FIG. 3) the protective assembly is seen as a "U" lying on its side and opening in the forward direction. At an opposite end of each long leg 58 from the short leg 60, there is provided a further short leg 64 that forms a pivot end region and is angled from the long leg 58 by approximately 10° to 15°, the short leg 64 being shown in dashed lines in FIG. 1.

The protective assembly 48 is connected in joints to the support masts 24, free to pivot about a pivot axis 66 (see FIG. 3). Here the short leg 64 is used for the bearing support and for the locking of the protective assembly 48. The connection in joints is made on both sides of the loader implement 10 by means of pins (not shown) that are inserted through bores 44 on the support mast 24 and through bores 68 in the short leg 64 of the protective assembly 48 (see FIG. 3), so that the protective assembly 48 is supported on pins, free to pivot.

In the embodiment described, the protective assembly 48 is supported in bearings or is locked directly on the support mast 24, while in another embodiment, a locking arrangement for the protective assembly 48 can be provided that is not combined with the support mast 24, and with this arrangement, a separate locking arrangement that is connected to the frame can be provided.

As is shown in FIGS. 1 and 4, the protective assembly 48 can be pivoted from an essentially vertical protective position, in which the protective assembly 48 is erected in order to protect an implement operator, into an essentially horizontal non-protective position (shown in dashed lines), in which the protective assembly 48 is laid across the hood 18 of the loader implement 10 in order to reduce the height of the loader implement 10. In the protective position, the long legs 58 extend upwards on both sides of the loader implement 10 parallel to each other (see FIG. 3) and are inclined towards the rear of the loader implement 10, from the vertical or from the short lower legs 64 of the protective assembly 48, by approximately 10° to 15°. The short upper legs 60 extend across the operator's platform 20 generally horizontally in the longitudinal direction toward the rear of the loader implement 10, where the cross member 62 extends transverse to the longitudinal direction across the operator's platform 20.

The lower end sections 64 are provided at each of their free end regions with a bore 70 (FIG. 4) that is used to lock the protective assembly 48. The protective assembly 48 can be locked in the protective position by means of pins 72 for the locking, for example, in the form of cylindrical pins, that are inserted through the bores 46 on the support masts 24 and through the bores 70 of the lower end sections 64.

In order to lock the protective assembly 48 in the non-protective position, the long legs 58 of the protective assembly 48 are equipped with brackets 74. In the embodiment shown, the brackets 74, in the form of triangular sheet metal elements, are arranged on the forward side of each of the long legs 58 in respective regions near the pivot axes 66 on the long legs 58 of the protective assembly 48, where the triangular sheet metal elements are arranged parallel to the support masts 24. The brackets 74 are provided with bores 76 that are used for the locking. The bores 76 are arranged in such a way that they are located at the same distance from the pivot axis 66 as the bores 56 on the support masts 24 that are provided for the fastening of the loader arrangement 26.

As can be seen clearly in FIGS. 1 and 4, the protective assembly 48 can be released from the protective position, by removing the pins 72 from the bores 46 and 70, and laid over the hood 18 of the loader implement 10 by pivoting the protective assembly in the forward direction to the non-protective position, shown in dashed lines, so that the long legs 58 of the protective assembly 48 are brought into an essentially horizontal position. During the pivoting, the end sections 64 perform a pivoting movement about the pivot axis 66 in the upward direction and are guided out of the upper end regions 38 of the support masts 24. Simultaneously, the brackets 74 perform a pivoting movement about the pivot axis 66 in the downward direction, and are guided into the upper end regions 38 of the support masts 24, until the bores 76 of the brackets 74 are aligned with the bores 56 for the loader arrangement 26. The protective assembly 48 is locked in the non-protective position by inserting the pins 72 into the bores 56 and 76.

As is shown in FIGS. 2 and 5, the loader arrangement 26 can be mounted on the loader implement 10. On both sides of the hood 18, the loader arrangement 26 includes the coupling components 52 that are used as mounting elements. Moreover, a loader arm 78 and a lifting cylinder 80 are provided on both sides of the hood 18, where the lifting cylinder 80 is used to raise and lower the loader arm 78. A loader tool 82 is arranged at the free end region of the loader arm 78, and is controlled by means of an actuating cylinder 84. Each of the coupling components 52 provides a connection between the mast support 24, the loader arm 78 and the hydraulic cylinder 80.

Figure 6:
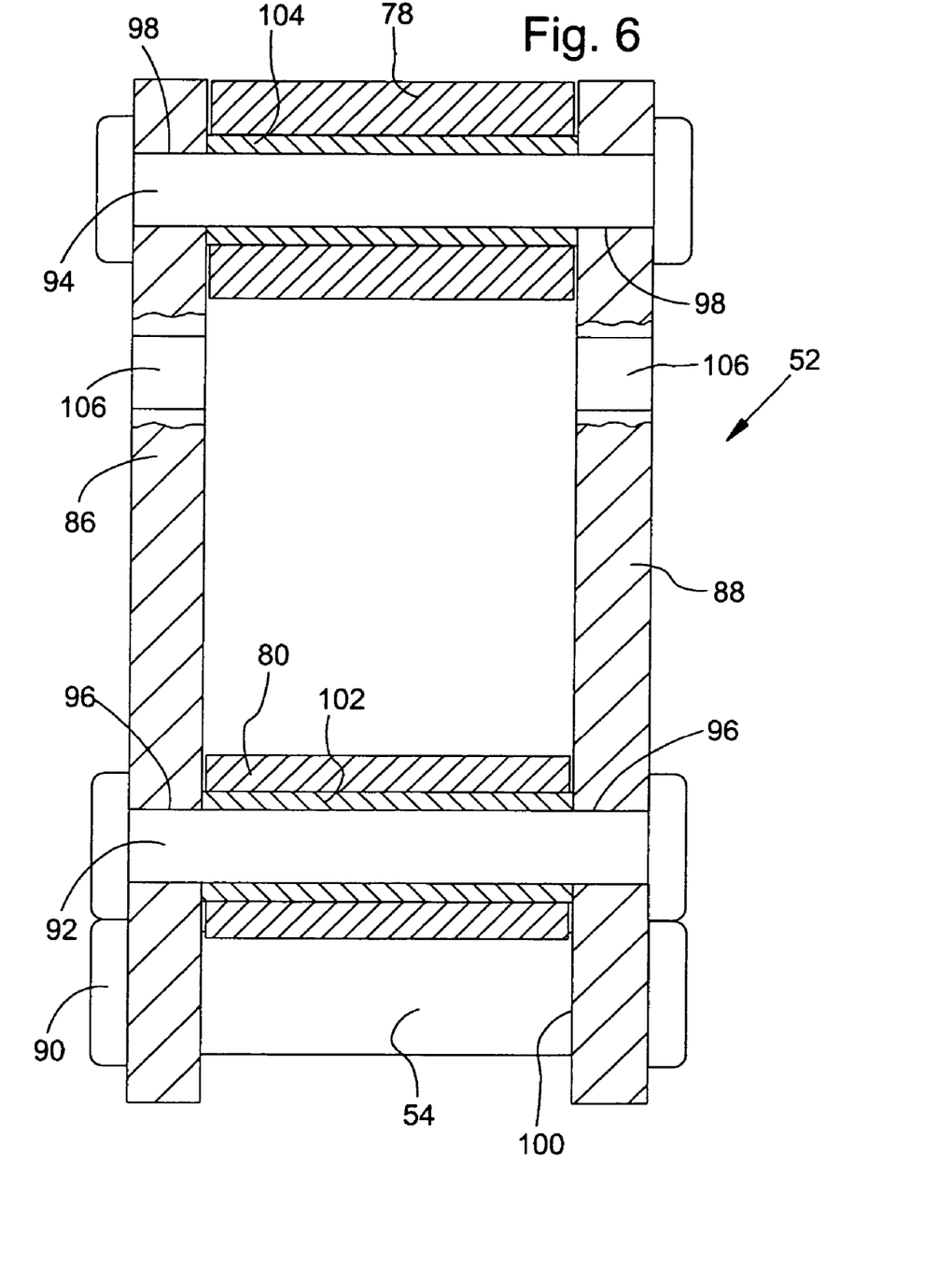
FIG. 6 is an enlarged sectional view taken along line 6—6 of FIG. 5.

The configuration of the coupling component 52 is shown in FIG. 6. The coupling component 52 includes two plates 86 and 88 that are shaped as trapezoids and are connected to each other by means of pins 90, 92 and 94. The plates 86 and 88 are provided with bores 96, 98, and 100 that accept the pins. Bearing sleeves 54, 102, and 104 are arranged between the plates 86 and 88, and are respectively received on the pins 90, 92 and 94, and permit the plates 86 and 88 to be clamped rigidly against each other at a predetermined distance from each other. The pins 90, 92 and 94 can, for example, be bolted to each other with the plates 86, and 88 or they can be welded together, or, as is shown in FIG. 6, riveted together. Together with the bearing sleeve 104, the pin 94 forms a pivot bearing for the loader arm 78, and the pin 92, together with the bearing sleeve 102, forms a bearing location for the hydraulic cylinder 80, which can be seen particularly well in FIG. 5. In connection with the bearing sleeve 54, the pin 90 forms a bearing axis that is used for the coupling and mounting of the loader arrangement 26. Furthermore, the coupling component 52 contains bores 106 arranged in the plates 86 and 88 that are used in combination with a pin 108 and with the bore 56 for the fastening of the coupling component 52 to the support mast 24.

The coupling and mounting of the loader arrangement 26 is performed as follows beginning with the non-protective position of the locked protective assembly 48. For the coupling of the loader arrangement 26 in the non-protective position, the locked protective assembly 48 must initially be released from the locked condition, since the bores 56 for the locking of the protective assembly 48 in the non-protective position are occupied and the support mast 24 for supporting the loader arrangement 26 are blocked. In this condition, a mounting of the loader arrangement 26 is not possible. The locking is released by removing the pins 72 from the bores 76 and the bores 56. Only by pivoting the protective structure assembly 48 into the protective position are the bores 56 freed for a fastening of the coupling components 52. The protective assembly 48 is locked in the protective position by inserting the pin 72 into the bores 46 and 70. The coupling to attach the loader arrangement 26 follows by means of laying the loader elements 54 of both coupling components 52 onto the receptacles 50 and the subsequent pivoting of the coupling components 52 about the bearing axis of the loader elements 54 in the direction of the bores 56, until the bores 56 are aligned with the bores 106 that are provided in the plates 86 and 88. Here it should be noted that the outer radius of the bearing sleeve 54 corresponds to the distance of the bore 56 from the center of the receptacle 50. This provides the assurance that the bores 56 and 106 can be brought into alignment with each other by pivoting the coupling component 52. By inserting the pin 108 into the bores 56 and 106, the coupling component 52 and with it also the loader arrangement 26 is rigidly connected with the support mast 24.

To improve the safety of the implement operator, a generally vertical roll-bar 110 is arranged in the rear region of the operator's platform 20. The roll-bar 110 is provided at half its height with a hinge 112 that can be locked by means of a threaded screw or a pin 114. Thereby the roll-bar 110 can selectively be brought into an erect, or a folded, position. In case the least possible height of the loader implement is desired, the forward protective assembly 48 can be pivoted into the non-protective position and the roll-bar 110 can be folded together.

As an alternative to the hinge 112, the roll-bar 110 can also be configured as a telescoping hollow member in such a way that the effective height of the roll-bar 110 can be infinitely adjusted by means of clamping screws that clamp the telescoped tubular sections together, or, alternatively, one of the telescoping tubes can be provided with a plurality of spaced holes and the other provided with a single hole whereby the roll-bar 110 can be locked in predetermined steps in height by inserting a fastener through the single hole and selected ones of the spaced holes. The protective assembly 48 can also be constructed of telescoping members. This makes it possible that even in loader operations the height of the loader implement can be reduced, and that a protective function is maintained thereby.

Preferably, the roll-bar 110 is also provided with an upper end section 116 extending horizontally and in the transverse direction across the operator's platform 20, that, however, extends forwardly. If the protective assembly 48 is in the protective position and the roll-bar 110 is in an erect position, as shown in FIGS. 1–3, the protective assembly 48 and the roll-bar 110 can be connected with each other, for example, by means of threaded screws that are conducted through bores, provided at 118 in FIG. 3. Thereby a cage-like protective design is created that is distinguished by high stability and offers the implement operator of the loader implement 10 a high degree of safety against falling loads particularly during loader operations.

Having described the preferred embodiment, it will become apparent that various modifications can be made without departing from the scope of the invention as defined in the accompanying claims.

The invention claimed is:

1. In a loader implement including a frame supported on wheels and having support masts coupled thereto at opposite sides of the implement, said support masts being provided with a mounting region configured for receiving complimentary components of a loader arrangement, a roll-over protective assembly being carried by the loader implement and mounted for movement between non-protective and protective positions relative to an operator's platform of said loader implement, the improvement comprising: said roll-over protective assembly being so constructed and located relative to said support mast that, when said roll-over protective structure is in its non-protective position, it blocks access to said mounting region so as to prevent a loader arrangement from being mounted to the support mast.

2. The loader implement, as defined in claim 1, wherein a locking arrangement is provided with which said protective arrangement can be selectively locked either in said protective position or in said non-protective position.

3. The loader implement, as defined in claim 2, wherein said mounting region of said mast is provided with at least one attachment point for said loader arrangement; and said locking arrangement occupying said at least one attachment point when locking said protective arrangement in said non-protective position.

4. The loader implement, as defined in claim 2, wherein said protective arrangement, when considered in its protective position, includes legs located at opposite sides of the operator's platform, with each leg including an upper leg section that extends generally horizontally above the operator's platform.

5. The loader implement, as defined in claim 4, wherein said opposite legs of said protective arrangement each include a long section located at opposite sides of, and below a top surface of, said loader implement when said protective arrangement is placed in said non-protective position.

6. The loader implement, as defined in claim 1, and further including a roll-bar that is arranged to the rear of the operator's platform and that extends generally vertically.

7. The loader implement, as defined in claim 6, wherein said roll-bar is constructed so that it can be folded to reduce its height.

8. The loader implement, as defined in claim 6, wherein said roll-bar includes telescopic upright members mounted for being releasably fixed in desired relationship to each other for obtaining a desired effective height of the roll-bar.

9. The loader implement, as defined in claim 4, wherein said protective arrangement includes a cross member joining rear ends of said upper leg sections; and a roll-bar being mounted at a rear location of said operator's platform and being releasably connected to said cross member of said protective arrangement.

* * * * *